(No Model.)

H. A. KINGSLAND.
MACHINE FOR INSERTING LACING STUDS.

No. 366,115. Patented July 5, 1887.

(No Model.)

9 Sheets—Sheet 2.

H. A. KINGSLAND.
MACHINE FOR INSERTING LACING STUDS.

No. 366,115. Patented July 5, 1887.

WITNESSES:
William Miller
A. Faber du Faur

INVENTOR
Hugh A. Kingsland.
BY
Van Santvoord & Hauff
his ATTORNEYS (No Model.)
H. A. KINGSLAND.
MACHINE FOR INSERTING LACING STUDS.
No. 366,115. Patented July 5, 1887.
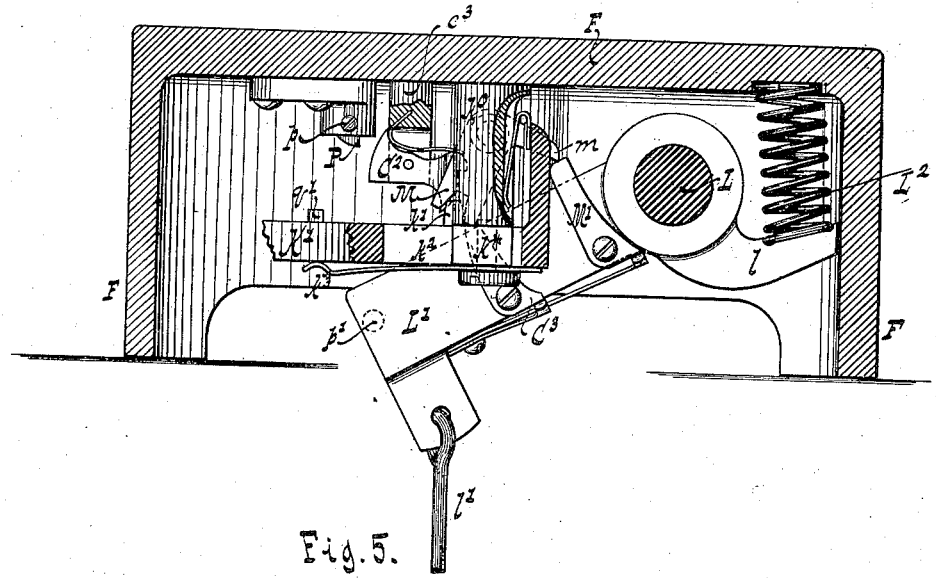
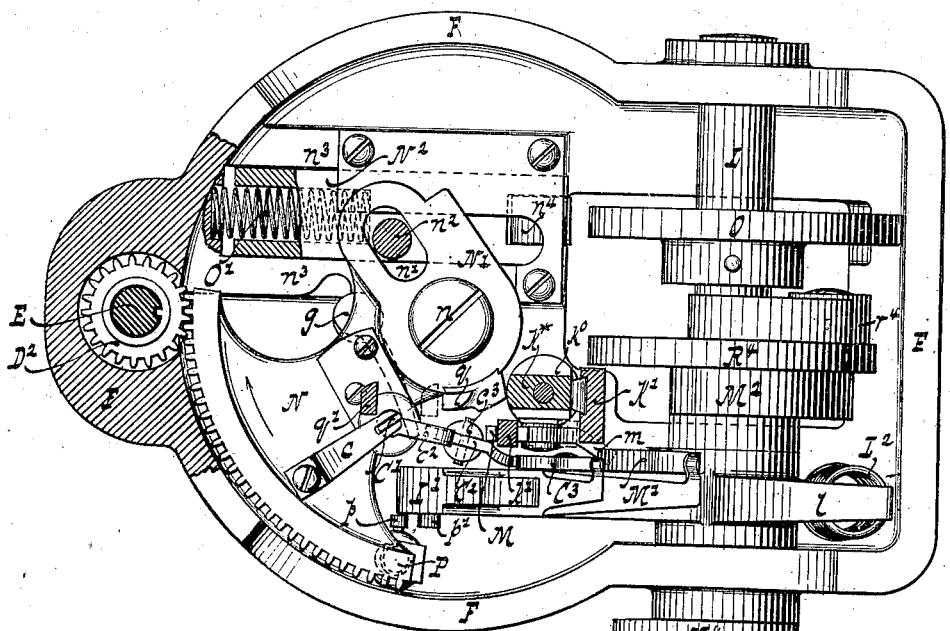
WITNESSES:
INVENTOR
Hugh A. Kingsland
BY
his ATTORNEYS

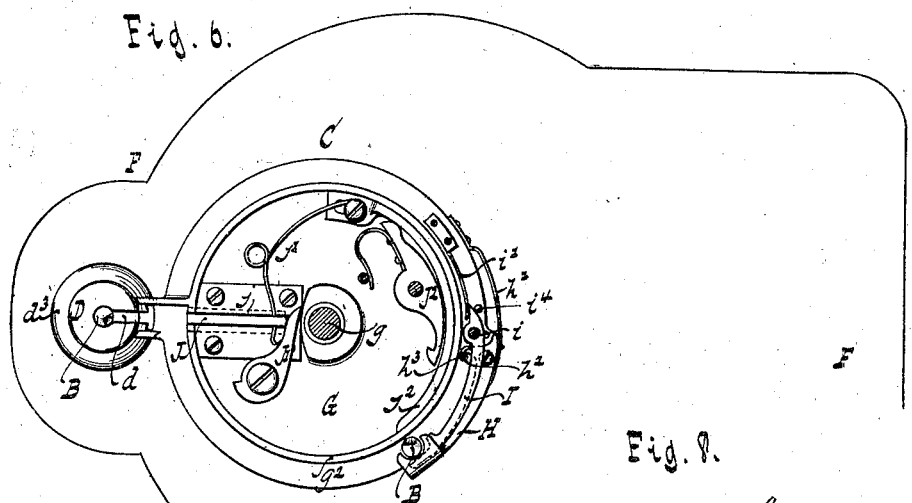

(No Model.)

H. A. KINGSLAND.
MACHINE FOR INSERTING LACING STUDS.

No. 366,115. Patented July 5, 1887.

9 Sheets—Sheet 5.

WITNESSES:
William L. Keller
A. Faber du Faur

INVENTOR
Hugh A. Kingsland
BY Van Santvoord & Hauff
his ATTORNEYS (No Model.)  9 Sheets—Sheet 6.

H. A. KINGSLAND.
MACHINE FOR INSERTING LACING STUDS.

No. 366,115.  Patented July 5, 1887.

WITNESSES:

INVENTOR
Hugh A. Kingsland.
BY
Van Santvoord & Hauff
his ATTORNEYS.

(No Model.)

H. A. KINGSLAND.

MACHINE FOR INSERTING LACING STUDS.

No. 366,115. Patented July 5, 1887.

WITNESSES:

INVENTOR

Hugh A. Kingsland

BY his ATTORNEYS (No Model.)

H. A. KINGSLAND.
MACHINE FOR INSERTING LACING STUDS.

No. 366,115. Patented July 5, 1887.

(No Model.)

H. A. KINGSLAND.
MACHINE FOR INSERTING LACING STUDS.

No. 366,115. Patented July 5, 1887.

WITNESSES:
A. Faber du Faur
William Miller

INVENTOR
Hugh A. Kingsland.
BY
Van Santvoord & Hauff
his ATTORNEYS.

UNITED STATES PATENT OFFICE.

HUGH A. KINGSLAND, OF NEWARK, NEW JERSEY.

MACHINE FOR INSERTING LACING-STUDS.

SPECIFICATION forming part of Letters Patent No. 366,115, dated July 5, 1887.

Application filed January 13, 1887. Serial No. 224,235. (No model.)

*To all whom it may concern:*

Be it known that I, HUGH A. KINGSLAND, a citizen of the United States, residing at Newark, in the county of Essex and State of New Jersey, have invented new and useful Improvements in Machines for Inserting Lacing-Studs, of which the following is a specification.

My invention relates to improvements in machines for inserting lacing-studs of the "screw type" into shoes, my object being to provide for the rapid and accurate insertion of such studs, which object I accomplish by a novel and peculiar construction of the operating parts, and by making the feeding of the studs to the machine and their insertion by the same entirely automatic.

The novel features of my invention consist in the combination of a chuck, a mechanism for imparting a rising and falling motion and for rotating the same, a feeder automatically delivering the lacing-studs, one at a time, a conveyer for receiving the same from the feeder and inserting them into the chuck, and a punch which fixes the studs in the shoe, all of which is more fully pointed out in the following specification and claims, and illustrated in the accompanying drawings, in which—

Figure 1:
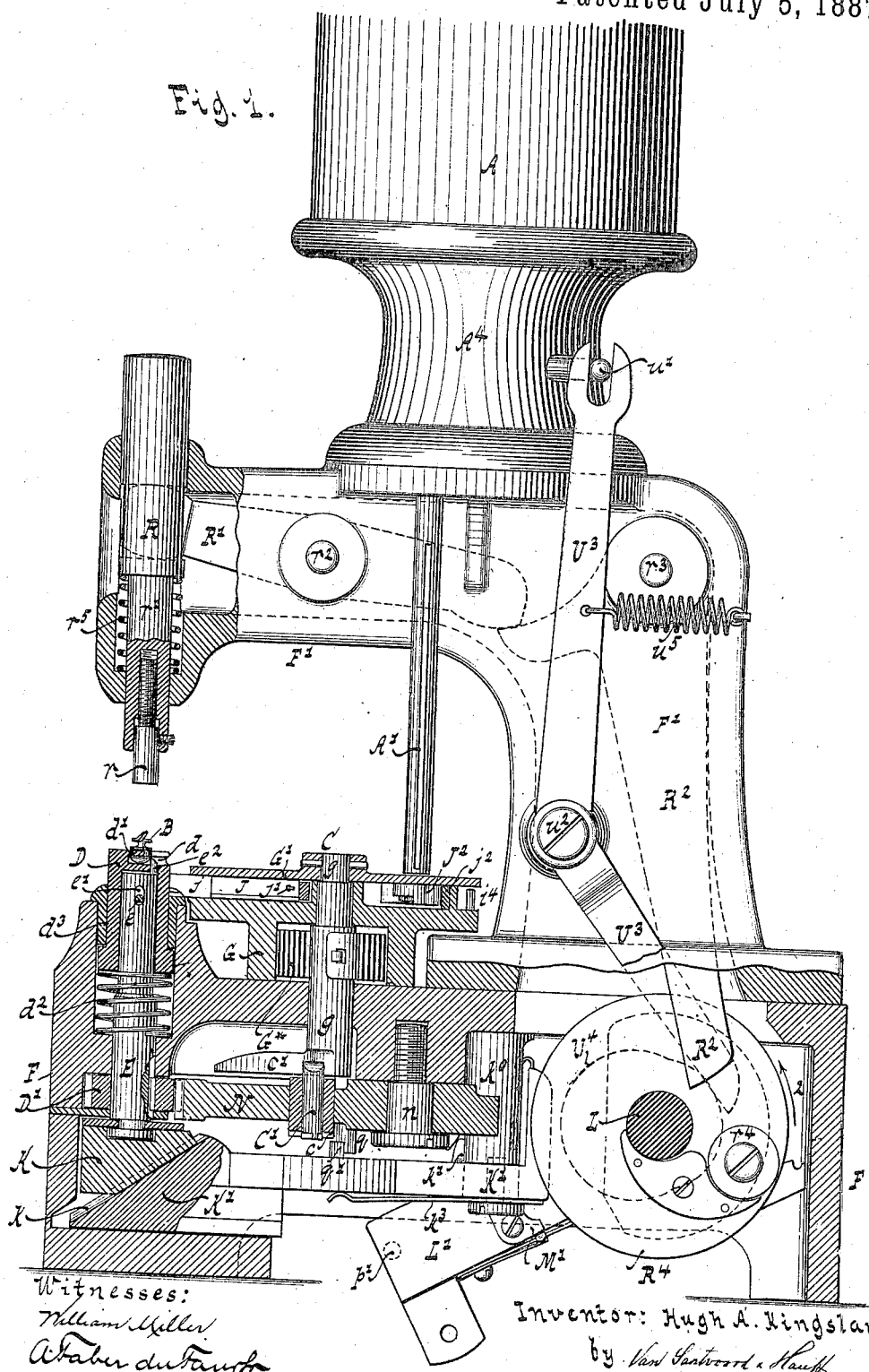
Figure 2:
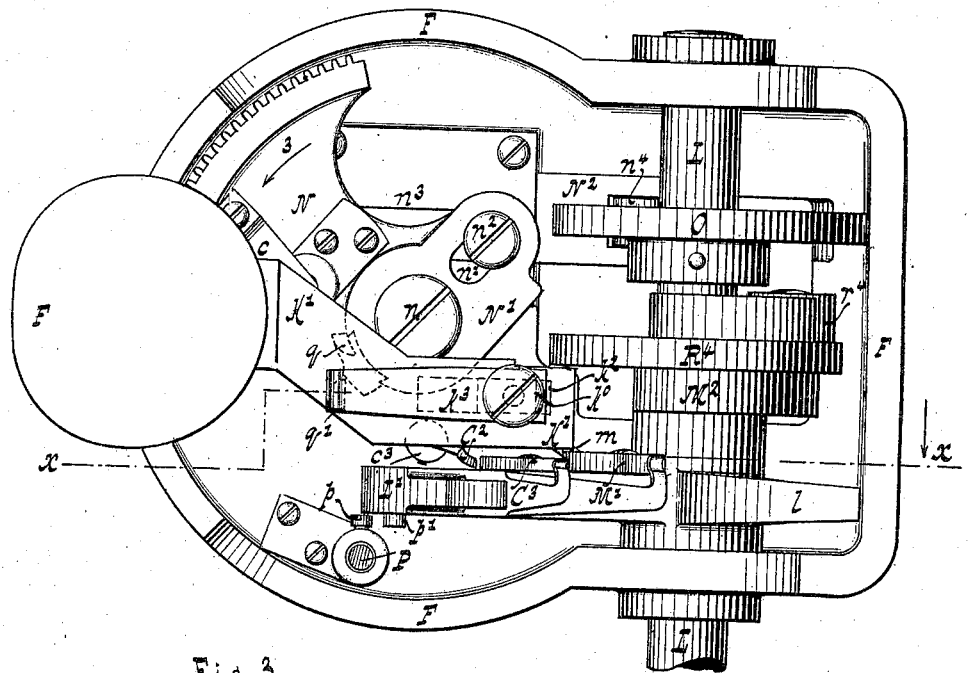
Figure 3:
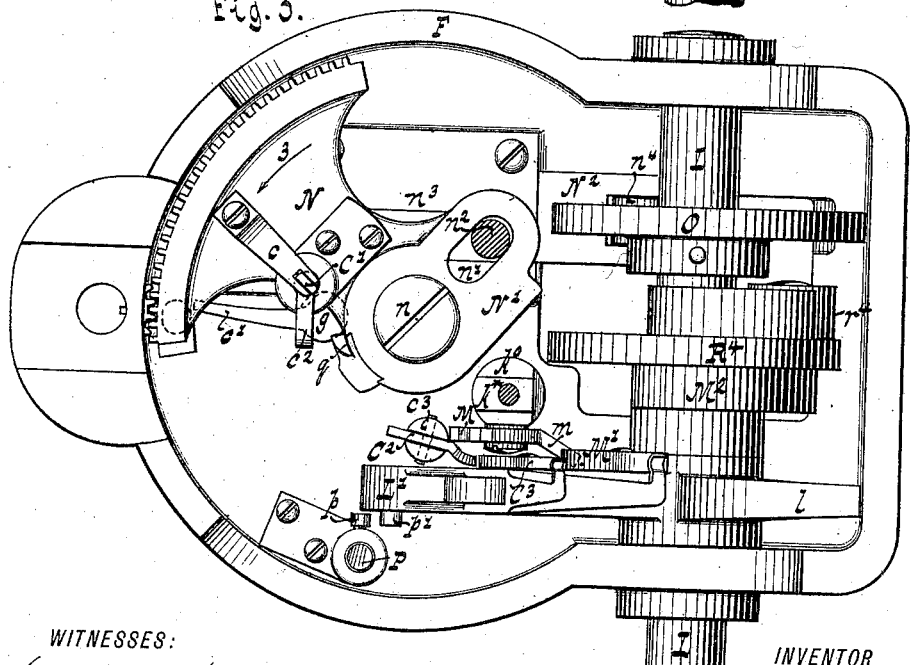
Figure 9:
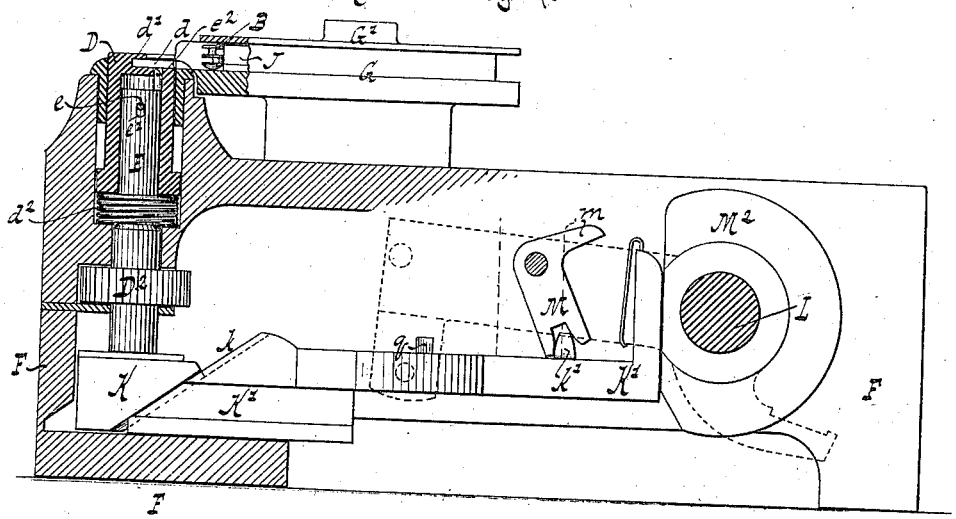
Figure 10:
Figure 12:
Figure 11:
Figure 13:
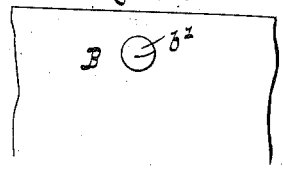
Figure 14:
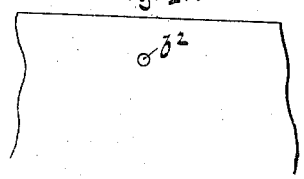
Figure 15:
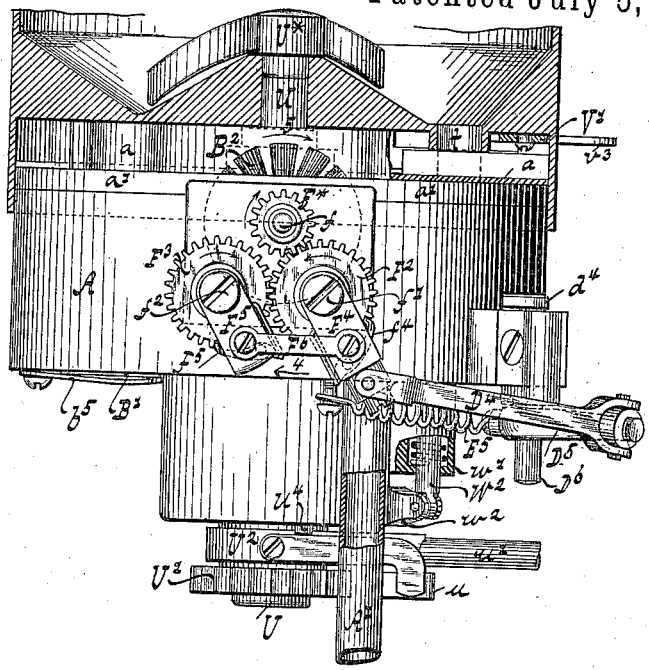
Figure 16:
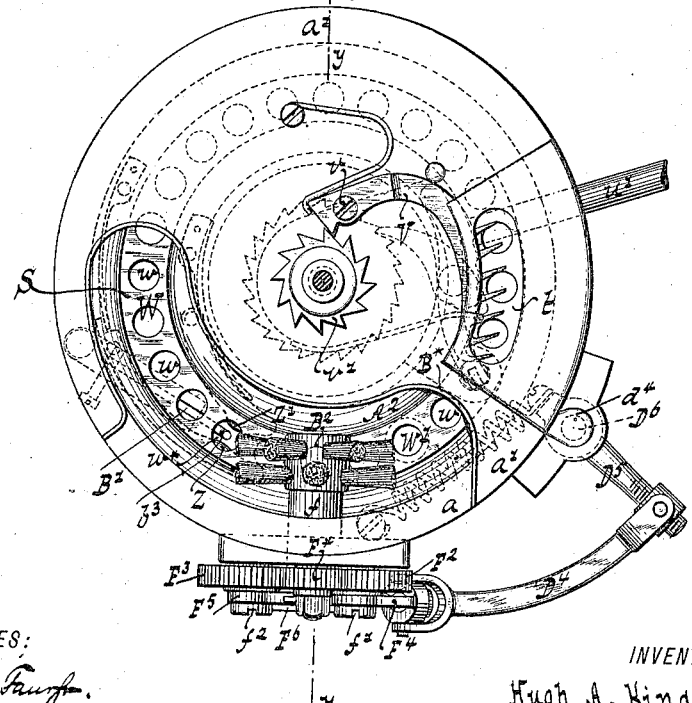
Figure 17:
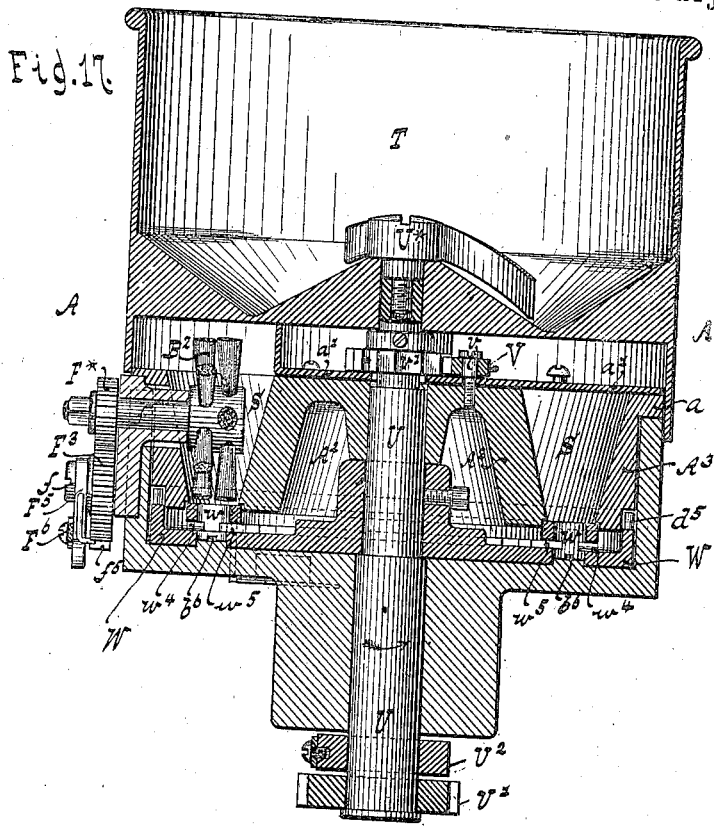
Figure 18:
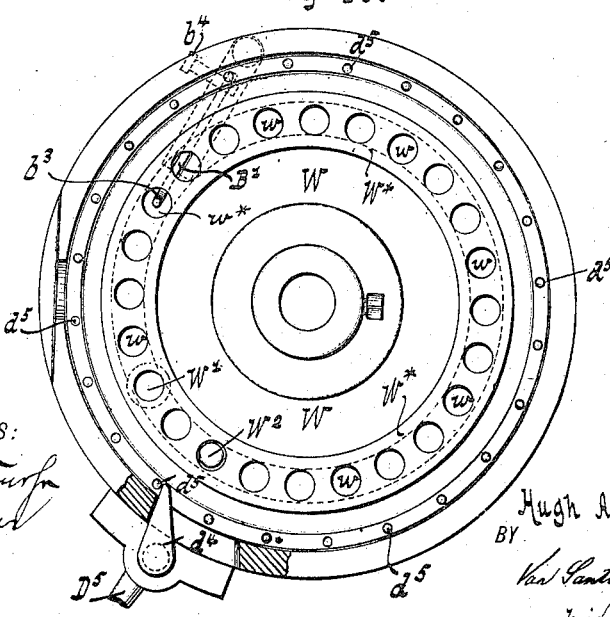
Figure 19:
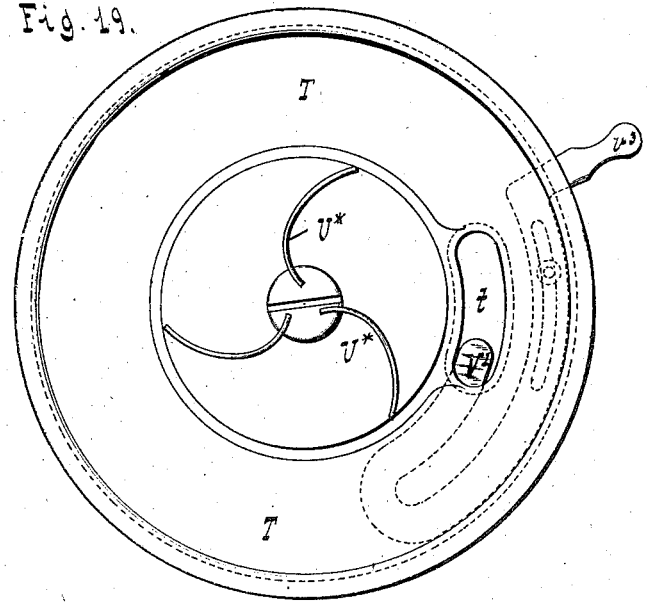
Figure 20:
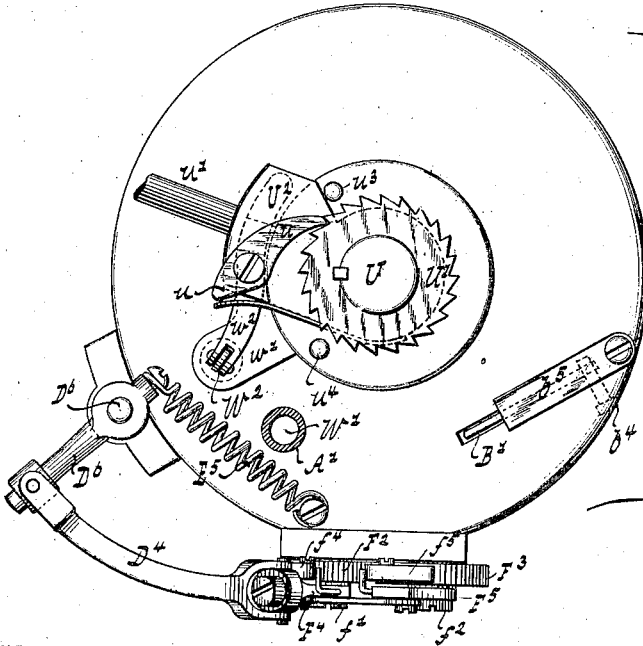
Figure 21:
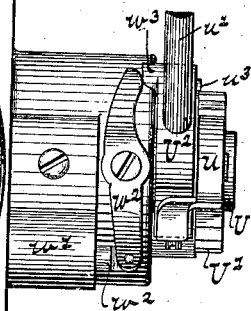
Figure 23:
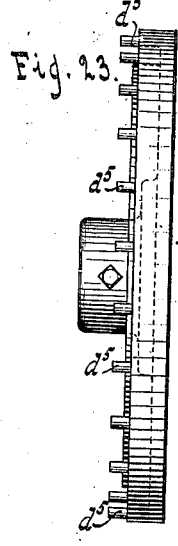
Figure 22:
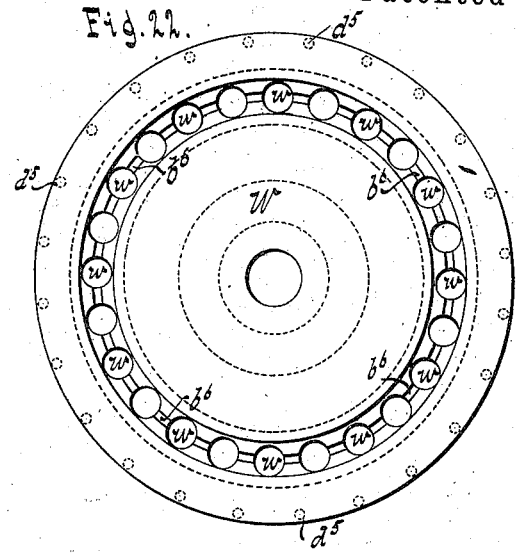
Figure 24:
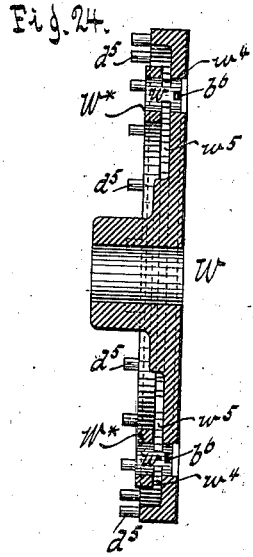
Figure 25:
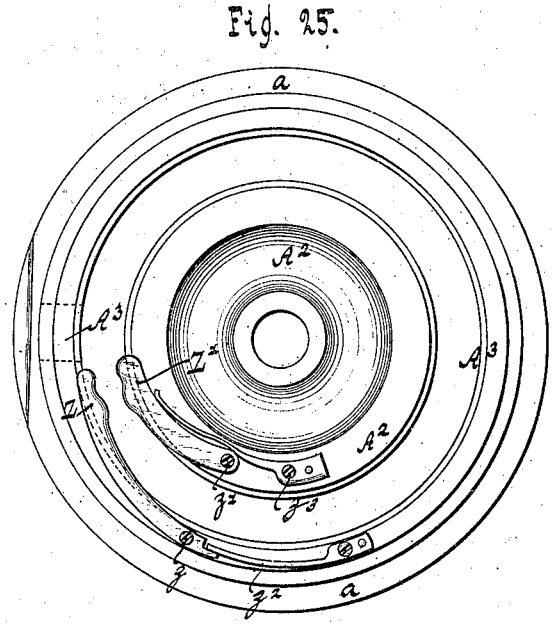
Figure 26:
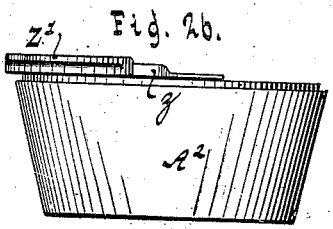

Figure 1 represents a sectional side elevation of a machine embodying my invention, the operating parts occupying the positions which they adopt when the machine is ready to screw a lacing-stud into the material. Fig. 2 is an inverted plan view of the same. Fig. 3 is a similar view with one of the operating parts removed. Fig. 4 is a vertical longitudinal section in the plane $x\ x$, Fig. 2. Fig. 5 is an inverted plan view of the machine, showing the parts in the position they occupy after the chuck has been rotated to insert the lacing-stud into the material. Fig. 6 is a sectional plan or top view showing the mechanism of the conveyer in the operation of inserting a stud into the chuck. Fig. 7 is a similar view showing the conveyer in its normal position. Fig. 8 is a plan view of the conveyer. Fig. 9 is a sectional side elevation of a portion of the machine. Fig. 10 is an elevation of a lacing-stud of the type for which this machine is adapted. Fig. 11 is an end view of the same. Fig. 12 is a side elevation showing the lacing-stud inserted. Fig. 13 is a face view of Fig. 12. Fig. 14 is a face view of the material as perforated to facilitate the introduction of the stud. Fig. 15 is an elevation, partly in section, of the feeder detached, this and the remaining figures being drawn to a larger scale than the previous figures. Fig. 16 is a plan or top view of the same with the hopper removed. Fig. 17 is a vertical section in the plane $y\ y$, Fig. 16. Fig. 18 is a sectional plan or top view with several of the operating parts removed. Fig. 19 is a plan or top view of the hopper. Fig. 20 is an inverted plan view of the entire feeder. Fig. 21 is a side elevation of a portion of the same. Fig. 22 is an inverted plan view of the feed-plate. Fig. 23 is a side elevation of the same. Fig. 24 is a central section thereof. Figs. 25 and 26 are respectively an inverted plan view and a side elevation of detail parts.

Similar letters indicate corresponding parts.

In the drawings, the letter A, Fig. 1, designates the feeder-containing mechanism for feeding the lacing-studs B, one at a time, to the inserting mechanism.

C is an oscillating conveyer which receives the lacing-studs, one at a time, from the feeder A and conveys the same to and inserts them in a chuck, D. The lacing stud shown in this example in Figs. 10 and 11, and for the reception of which this chuck is especially constructed, consists of an open or socketed head having an eccentric shank, $b$, and a concentric shank having at its head a spiral or screw, $b'$, which is intended to be screwed into the material, the latter being previously perforated, as at $b^2$ in Fig. 14, to allow the spiral or screw to bite. After insertion of the stud its spiral or screw is flattened out, as in Figs. 12 and 13, whereby it is firmly secured in place.

The chuck D, Figs. 1, 6, 7, and 9, is constructed in cap form, and has in its upper end a socket or jaw, $d$, which receives the lacing-stud from the conveyer. This socket opens laterally, and is so constructed that the stud can slide therein, provided its eccentric shank $b$ is at the rear; and the chuck contains a nose, $d'$, which enters the head of the stud, so that said stud is held firmly and cannot rotate or yield as the chuck rotates. The chuck D fits over the end of a vertical spindle, E, to which it is connected by a pin, $e$, which extends through a slot, $e'$, in the latter. On the upper end of this spindle is a projection or pin, $e^2$, which can extend upwardly through an aperture in the chuck D and to the rear of the stud in the chuck. The slot $e'$ in the spindle E allows the latter to move vertically until the retaining-pin $e^2$ is in a position behind the stud before the chuck D is moved, this being necessary to secure the lacing stud and prevent it from moving laterally out of the socket. The chuck D is supported upon a spring, $d^2$, and its vertical motion is limited by a sleeve, $d^3$, with which a shoulder on the former comes into contact. This sleeve is cut away or provided with a way or channel for the passage of the lacing-stud to the chuck.

The conveyer C, Figs. 1, 6, 7, and 8, is situated on the upper portion of the casing F, and oscillates in a horizontal plane. It receives the lacing-studs from a tube, A', Fig. 1, in which latter they descend from the feeder A, always in the position shown in Fig. 10—that is, head downward. The conveyer consists of a body, G, circular in form, which is rigidly attached to the casing F, and a cover or disk, G', which is attached to a spindle, $g$, extending downwardly and having bearings in the body G and the casing. A space is formed between the body and cover by a hub and a circular ledge or wall, $g^2$, on the body, and between the body and cover are the operating parts of said conveyer.

In the periphery of the cover G', Fig. 8, is formed a recess, $g'$, which is directly under and in line with the feed-tube A' when the conveyer is in position to receive a lacing-stud. A guide-lever, H, provided with a socket, is hinged at $h$ to the body G, Figs. 6 and 7, and is pressed outward by a spring, $h'$, as in Fig. 7; but when the conveyer is in position to receive the lacing-stud, Fig. 6, it is pressed inward and aids in forming a socket for the reception of the latter. This throwing inward of the lever H is accomplished by a pin, $h^2$, on the cover G', which engages a tail, $h^3$, on the said lever as the cover moves toward the feed-tube A', Fig. 6.

To hold the lacing-stud against the circular ledge or wall $g^2$ on the body G as the cover G' rotates in the direction of arrow 1, Fig. 7, toward the chuck D, I provide a lever, I, which is pivoted at $i$, Figs. 6 and 7, to the cover. One arm of this lever is acted on by a spring, $i'$, which presses the other arm inward, and this latter arm has a portion cut away to form a jaw, $i^2$, Fig. 7, which jaw enters the socket in the head of the lacing-stud and comes almost but not into actual contact with the eccentric shank $b$, and thus holds the lacing-stud. The lacing-stud, as before stated, can only enter the chuck D when in one position—viz., with the eccentric shank $b$ in the rear, and it will be observed that this lever I, owing to the formation of its jaw $i^2$, will always turn the stud, no matter how it may enter the conveyer, into the proper position. The lever I is actuated to open when the conveyer is in its receiving position by a pin, $i^4$, on the body G, which engages an inclined cam-surface on one arm of said lever. The cover G', Fig. 9, in rotating, conveys the lacing-stud into a line with the socket $d$ in the chuck D, where it is deposited on the reversal of the motion of said cover. The stud is inserted into the chuck by a spring-pressed bolt, J, which is guided in suitable ways, $j$, in the body G, and is actuated, as the cover G', Fig. 7, reverses, by a lever, J', one arm of which engages the rear of the bolt. The other arm of said lever is provided with a tooth which is engaged by a spring-pressed toothed catch, J$^2$, carried by and pivoted to the cover. The spring $j'$, engaging the bolt, returns the latter to the position shown in Fig. 6. The catch J$^2$ is caused to release the lever J' by a cam-surface, $j^2$, on the body G, which engages said latch. The means for actuating the cover G' in its oscillatory motion will be presently explained.

On inspecting Figs. 1, 6, 7, and 9 it will be observed that the chuck D, before receiving the stud, is depressed, Fig. 9, so as to bring the socket $d$ therein on a level with the conveyer, and when it is ready to be rotated for the insertion of the lacing-stud it is elevated, as in Fig. 1, this elevation being necessary in order to place the work on the chuck. The motions necessary to be imparted to the chuck are therefore, first, an upward motion, after the reception of the stud, then a rotary motion for its insertion, and, finally, a downward motion to the level of the conveyer, for the reception of the next lacing-stud. These motions I obtain as follows: The lower end of the chuck-bearing spindle E is socketed, so as to allow the rotation of the spindle about its vertical axis, in a wedged-shaped carrier, K, Figs. 1 and 9, which latter can move vertically in ways in the casing F. This carrier K is connected by a dovetail joint with a reciprocating slide, K', having an inclined working-face, $k$, so that when the said slide is in the position shown in Fig. 9 the chuck is drawn to its lowest or receiving position, and when in the position shown in Fig. 1 is moved to its highest or inserting position. The slide K' is guided by a block, $k^*$, Figs. 1, 2, and 4, which extends from a post, $k^0$, on the frame, and enters a longitudinal slot, $k^2$, in said slide. A flat spring, $k^3$, bearing on the slide, retains it in any position it may be placed.

To the main shaft L of the machine is loosely secured, so as to turn about the same as an axis, a crank-lever, $l$ L', one arm of which is connected with a treadle (not shown in the drawings) by a rod, $l'$, Fig. 4, and the other arm, $l$, is subjected to the action of a spring, L$^2$, which tends to hold said lever in the position shown by dotted lines in Fig. 9. At the same time this lever $l$ L' is drawn downward to the position shown in Fig. 1, a rotary motion in the direction of arrow 2, Fig. 1, is imparted to main shaft L by any suitable means—such, for instance, as a clutch connected with the treadle—and such rotation of this shaft is limited to one revolution by the said clutch or other well-known means. Such mechanism being old, it forms no part of my invention and is not shown in the drawings.

On the slide K', and near the inner end thereof, is a tooth or projection, k', Figs. 1, 2, 4, and 9, which is engaged by one arm, M, of a forked bell-crank lever, M m, Figs. 2, 4, 5, and 9, the other arm, m, thereof being engaged by a spring-pressed and pivoted trip-cam, M', carried by the crank-lever L' l. When the latter lever moves to the position shown in Fig. 9 by dotted lines, the slide K' is drawn back against a stop cam or wheel, M², mounted on the shaft L, and the chuck D is ready to receive the stud. The chuck is elevated by means presently to be described.

To rotate the chuck when in its elevated position, I feather a gear-wheel, D', thereto, which remains stationary while the chuck moves longitudinally, by reason of stops at its top and bottom, and said gear-wheel is engaged by a segmental and cogged driver, N, Figs. 1, 2, 3, and 5, which is pivoted at n to a hub of the casing. From this segmental driver extends an arm, N', containing a slot, n', in which plays a vertical pin, n², projecting from a slide, N². This slide can move in ways n³, formed in the casing, and carries on its end a roller-stud, n⁴, which is engaged by a cam, O, mounted on the main shaft L, which cam has a proper contour to move the slide forward. The driving-segment N is moved in a forward direction, as indicated by arrow 3, Fig. 2, by the action of the cam O, Fig. 3, and to the position shown in Fig. 5, where it is retained by a spring bolt or catch, P, that projects from the casing F and engages a depression in the segment. The catch P is provided with an extending pin or projection, p, whereby said catch can be raised or withdrawn, so as to release the driving segment N. The said segment is returned to the position shown in Fig. 3 by the action of a spring, O', bearing against one end of the slide N² when the segment is released from the latch P. When the crank-lever l L' is moved toward the position shown in Fig. 9, and when near the end of its stroke, a projection, p', thereon engages the pin on the latch P and depresses the latter, whereby the driving segment is released and the chuck D is rotated to its receiving position.

The driving segment N carries a vertically-movable stud, C', which is subjected to the action of a spring-plate, c, Figs. 1, 3, and 5. The end of said stud projects above the driving segment, and is adapted to engage with an arm, c', extending laterally from the driving-spindle g of the conveyer C, so that when the segment moves in the direction of arrow 3, Fig. 3, the stud carries said arm c' with it and rotates the conveyer-spindle g. This rotation moves the conveyer so as to bring the lacing-stud in front of the inserting-bolt J.

From the stud C' extends a lateral arm, c², which is adapted to pass under a spring-pressed trip-lever, C², pivoted in a post, C³, when the segment N moves toward its latch P.

On the crank-lever l L', Figs. 2, 3, 4, and 5, is a spring-pressed cam-lever, c³, which engages one arm of the trip-lever C² when said lever l L' is depressed, thereby causing said lever C² to push the stud C' downward and effect the release of the arm c' of the conveyer-spindle g. The conveyer is under the action of coiled spring G*, Fig. 1, which causes it to turn in a direction opposite to arrow 1, Fig. 7, and the inserting-bolt J of the conveyer is actuated to insert the lacing-stud into the chuck D, said stud remaining in front of the bolt as the conveyer reverses. To raise the chuck from the position shown in Fig. 9, after the insertion of the lacing-stud into its jaws, the driving-segment N carries a projection or tooth, q, Figs. 2, 3, 4, and 5, and the slide K' a projection or tooth, q'. These teeth are so arranged that when the segment N is in the position shown in Fig. 3, and the slide K' in its forward position, the driving-segment N can move to the position shown in Fig. 5 without the teeth q q' coming into engagement with each other; but when the crank-lever l L' is depressed the slide K' is first moved backward to depress the chuck, and into the position shown in Fig. 9, as before described. On the subsequent release of the lever l L' the tooth q thereon engages the tooth q' on the said slide and moves it forward to elevate the chuck, as in Figs. 1 and 2.

The punch R, Fig. 1, is mounted in a hollow arm, F', of the casing, in a direct line with the chuck D, and it is actuated to impinge on the stud directly after the same has been inserted into the work and while the chuck is in its raised position. In the example shown in the drawings, the punch R is provided with an adjustable portion, r, which is screwed into a threaded socket in a shank, r', and held secure after the adjustment by a set-screw. The punch can move in the direction of its length, and is depressed by a lever, R', pivoted at r², one arm of which engages the same, its other arm being acted on by the horizontal arm of a bell-crank lever, R², pivoted at r³. The vertical arm of this lever R² is engaged by an eccentric roller-stud, r⁴, secured to the face of a disk or collar, R⁴, on the driving shaft, whereby said crank-lever is vibrated about its shaft. The punch is withdrawn or raised by a spiral spring, r⁵, Fig. 1.

The feeder A, Figs. 15 to 26, both inclusive, consists of a circular casing or body containing a circular sleeve, A³, which is suspended therein by a flange, a, at its top, the lower edge of said sleeve being at a distance above the bottom of the casing. This sleeve has an inner inclined face or wall, and located centrally with regard to the same is a conical hub, A², which forms with the sleeve an annular receiving-chamber, S. The sleeve is partially closed at its top by a cover, a'. The casing rests in a support, A⁴, secured to the arm F' of the machine, Fig. 7, and to the said casing is secured a hopper, T, having a discharge orifice, t, communicating with the receiving-chamber S, and through which orifice the lacing-studs enter the chamber, a similar and correspondingly-placed orifice being formed in the cover $a'$ of the sleeve $A^3$.

The hub $A^2$ is secured to the cover $a'$ of the casing by any suitable means. A vertical shaft, U, extends through the casing hub and into the hopper, having bearings in all of the same. On the upper end of this shaft is an agitator, $U^*$, which keeps the lacing-studs from clogging and causes them to drop through the discharge-orifice $t$. An intermittent rotary motion is imparted to this shaft U from the main shaft L, Fig. 1, of the machine, as follows: At the bottom of the shaft U, and below the casing, is secured a ratchet-wheel, $U'$, which is engaged by a spring-pressed pawl, $u$, Figs. 15, 20, 21, carried by an arm, $U^2$. This arm is loosely secured to the shaft U, and can swing about the same, and a rod, $u'$, extending from the same, projects through a slot in the support $A^4$, Fig. 1, and is engaged by a forked lever, $U^3$, that is pivoted at $u^2$, and is engaged on the lower side of its pivot by a cam, $U^4$, having a suitable contour to give a vibratory motion to said lever. A strong spring, $u^5$, keeps the lever pressed against the cam. The arm $U^2$ vibrates between stops $u^3$ and $u^4$, Fig. 20, so that the pawl can advance only one tooth at each vibration and rotate the shaft U correspondingly.

In order to prevent the lacing studs from clogging up the discharge-orifice $t$, a clearing-lever, V, Fig. 16, is used, which is provided with a number of teeth or prongs. This clearing-lever is situated directly above the discharge-orifice and is pivoted at $v$ to the cover of the casing, and it is vibrated by a ratchet or toothed wheel, $v'$, engaging with said lever, in conjunction with a spring, $v^2$. The ratchet-wheel $v'$ is secured to the shaft U and rotates over the same.

To regulate the quantity of lacing-studs discharged, a gate, V′, Fig. 19, is adjustably secured to the bottom of the hopper, which gate is provided with a handle, $v^3$, projecting laterally. A set-screw secured in the bottom of the hopper and engaging with a slot in the gate permits the adjustment of the same. In the bottom of the feeder-casing is located a feed-plate, W, containing a circular series of cells, $w$, which are adapted to receive the lacing-studs entering the receiving-chamber S. This feed-plate W is secured to the shaft U and rotates with the same. In a convenient point in the bottom of the hopper T is formed a discharge-orifice, W′, of the same diameter as the cells $w$, and said discharge-orifice is at the same distance from the center as the cells in the feed-plate. The plate W being rotated through a space equal to the distance between the centers of two consecutive cells, $w$, the latter are brought successively in line with the discharge-orifice W′, and the lacing-stud can pass through the same and into the feed-tube A′, connecting with the conveyer C.

In order to insure a perfect alignment of cell and discharge-orifice, a stop, $W^2$, Figs. 16 and 18, is made to engage with one of the cells at each movement of the plate. In this example said stop consists of a spring-pressed pintle, $W^2$, which has bearings in a housing, $w$, and is actuated by a lever, $w^2$, Figs. 15 and 20, said lever being engaged by a cam-surface, $w^3$, on the arm $U^2$, Fig. 21. This cam-surface $w^3$ draws and holds the pintle out of engagement with the cells $w$ when the arm $U^2$ is drawn forward to cause the pawl $u$ to engage a tooth, and the spring snaps the pintle into a cell as soon as the feed-plate W ceases to rotate.

In order that the lacing-studs can pass out of the discharge-orifice W′ only in the proper position—that is, with their heads down and spiral up—I employ mechanism for ejecting all such studs as have not been received by the cells $w$ in such position, and for retaining those in the cells that have been properly received. For this purpose the feed-plate W, Figs. 17, 18, 22, 23, and 24, has vertical annular grooves or depressions on each side of the cells $w$, Fig. 24, to form a projecting cell-ring, $W^*$, and from such depressions extend horizontal ways or grooves $w^4$ and $w^5$, extending entirely around the inner and outer peripheries of the cell-ring $W^*$; and into said grooves $w^3$ and $w^5$ penetrate from each side of the ring $W^*$ two jaws, Z Z′, which are pivoted at $z\ z'$, respectively, to the sleeve $A^3$ and the hub $A^2$. The jaws Z Z′ are subjected to the action of springs $z^2$ and $z^3$, which tend to force the same toward each other. These jaws Z Z′ are directly opposite each other and extend into the cells successively as the feed-plate W rotates. In this example they are in a cell, $w^*$, and it will be observed that as the feed-plate rotates said jaws will be vibrated—that is, will be pushed apart to allow the lacing-stud in the cell to pass between them, and then close again as the feed-plate ceases to move. Suppose, now, that a lacing-stud has entered one of the cells with its head down and such cell reaches the jaws, and in this case it will be observed that the jaws Z Z′ will enter the socket $b$ in such head from each side and hold the same; but if the lacing-stud enters a cell with its spiral end down the jaws can obtain no hold on the lacing-stud, as the projecting point or screw cannot be grasped by the jaws.

An ejector consisting of an arm or shank, B′, having a nose, $b^3$, which projects upward and into the cell $w^*$ between the jaws Z Z′, acts to expel all such studs as are not held by the jaws. The ejector is pivoted at $b^4$, and plays through a slot in the bottom of the hopper. A spring-plate, $b^5$, keeps its shank constantly pressed upward and against the bottom of the feed-plate. In the said bottom, Figs. 22 and 24, is a groove, $b^6$, the divisions of the same, formed by the cells, being tapering in the proper direction to form cam-surfaces, which act against the inclined or sloping surface of the nose $b^3$ to depress the ejecting-arm as the feed-plate rotates. The ejector, due to the action of its spring-plate $b^5$, snaps into the successive cells with sufficient force to eject such studs as are not held by the jaws—that is, those which have not properly entered the cells—while those which have so entered the cells are not ejected, and, passing to the discharge-orifice W', are discharged in their turn. In order, however, that such studs as are ejected may not accumulate about the cell $w^*$, and also to turn them in order to facilitate the chance of their entering another cell in the proper position, I provide a distributing brush-wheel, B², which rotates as the feed-plate W rotates, and the ejected lacing studs coming into contact therewith are promptly thrown back into the space of receiving-chamber S. This brush-wheel also prevents any of the lacing-studs not in cells from passing over to the discharge-orifice, the access of such studs being prevented on the other side of said orifice by a diaphragm or partition, B*, extending across the receiving-chamber from top to bottom at a point between this discharge and the discharge-orifice $t$ of the hopper T, Fig. 16. In the example shown in the drawings the brush is actuated as follows, Figs. 15, 16, and 17: The brush-wheel is mounted on an arbor, $f$, which has a bearing in a frame attached to the casing. To the outer end of the said arbor is firmly attached a gear-wheel, F*, which is in engagement with a gear-wheel, F², that rotates about a stud, $f'$, on the frame attached to the casing. A third gear, F³, engages with the gear F², the studs $f'$ $f^2$ of the last two gears being in the same horizontal line. From the studs $f'$ $f^2$ of said gears F² F³ are loosely swung arms F⁴ F⁵, the free ends of which are joined by a link, F⁶. These arms carry spring-pressed pawls $f^4$ $f^5$, which are adapted to engage with the teeth of the respective gears F² F³, to rotate the latter in the direction of the arrows marked thereon in Fig. 15, but to leave them undisturbed when said pawls are moved in an opposite direction. The arm F⁴ is connected by a universal joint to a link, D⁴, the other end of which is connected by a similar joint to a lever, D⁵, on a vertical rock-shaft, D⁶. On the upper end of said shaft D⁶ is an arm, $d'$, which projects inwardly through a slot in the casing, and is successively engaged by pins $d^5$, arranged on the feed-plate W, as the latter rotates. A spring, E⁵, connected with the second arm of the lever D⁵, returns the lever after its disengagement by the successive pins $d^5$. When the arm $d'$ is moved by one of the pins $d^5$, the pawl-frame F⁴ F⁵ is moved in the direction of arrow 4, Fig. 15, and the pawl $f^4$, engaging the gear F², moves it in the direction of the arrow marked thereon. The motion is transmitted through gear F² to the gear F³, and the brush is rotated in the direction of arrow 5. As the pin $d^5$ releases the arm $d'$ the pawl-frame F⁴ F⁵ is rapidly moved by the spring E⁵ in an opposite direction, the gear F³ is rotated in the direction of the arrow thereon, Fig. 15, and the brush is rotated in the same direction as before, but with a greatly-accelerated velocity. This accelerated rotation of the brush-wheel takes place just as the ejector expels a lacing-stud, if such has not been properly received by the cell, and the lacing-stud thus ejected is thrown out into the space of the receiving-chamber. The lacing-studs which are retained in the cells pass the jaws Z Z', and on arriving in line with the discharge-orifice W' drop through the same and into the feed-tube A', from which they enter the conveyer from time to time.

The operation of the inserting mechanism is as follows: As shown in the drawings, in Figs. 1, 2, 3, and 4, the operating parts are in a position in which the chuck D contains a lacing-stud and is in its elevated position. When the crank-lever $l$ L' is now depressed, as shown in the said figures, the main shaft L is caused to make one complete rotation and then stop. During this rotation the driving-segment N is moved in the direction of arrow 3, Figs. 2 and 3, about its pivot, and at the end of its movement is locked by the latch P, Fig. 5. The conveyer C, Figs. 6 and 7, before the movement of the shaft, had received a lacing-stud from the feeder, as in Fig. 6. The spring-stud C' on the driving-segment engages the arm $c^2$ of the conveyer and rotates the latter as the segment rotates, thereby bringing the lacing-stud in line with the chuck D, and holds it in readiness for subsequent insertion. The driving-segment N in its motion rotates the chuck a complete revolution, and the lacing-stud therein is screwed into the material. The punch D now descends and rivets over the spiral on the lacing-stud. The shaft having completed an entire revolution, the treadle is released and the crank-lever $l$ L' is returned toward the position shown in Fig. 9 by the spring L². In this stroke of the crank-lever the slide K', Figs. 2 and 4, is drawn back against the flat portion of the hub or sleeve M², whereby the punch D is lowered to its receiving position a little later, or about at the same time the arm $c^2$ of the conveyer-shaft is released, and, due to the action of the spring G*, Fig. 1, the conveyer-cover is rapidly moved in the direction of the arrow 1, Fig. 7, to the position shown in Fig. 2, or its receiving position, and immediately on the commencement of this reverse movement the bolt J inserts the lacing-stud into the chuck, such stud having remained in front of the bolt when the conveyer started to rotate in the said direction of arrow 3, Fig. 3. The crank-lever now releases the driving-segment, which returns to the position shown in Figs. 2 and 3 and rotates the chuck. This rotation has, however, no useful effect; and, if desired, the chuck could be so geared as not to be rotated by the segment in this stroke of the same. The segment on its release throws the slide K' inward by reason of the respective teeth $q$ $q'$, Fig. 5, engaging with each other, and such motion of the slide K' elevates the punch D to its inserting position, Fig. 7, and the machine inserts the lacing-stud therein on the depression of the crank-lever.

The feed-tube $A^2$ is provided with a narrow longitudinal slot, in order that the number of lacing-studs therein can be observed.

To prevent any part of the feeder A, Fig. 1, being injured in case a lacing-stud should get caught or wedged in any manner, I cause the cam $U^4$ to move the actuating-lever $U^3$ on its non-working stroke—that is to say, that stroke in which the lever draws back the pawl $u$ to engage with a new tooth—while power for the actual rotation of the shaft U is furnished by the strong spring $u^5$, so that in case of accident the feeder would be subjected only to the slight strain caused by the said spring.

What I claim as new, and desire to secure by Letters Patent, is—

1. The combination, in a machine for inserting lacing-studs, of a feeder, a pivoted oscillating conveyer, a conduit for conducting the studs from the feeder to the oscillating conveyer, a rotary chuck, and devices carried by the conveyer for inserting the stud into the chuck, substantially as described.

2. The combination, in a machine for inserting lacing-studs, of a feeder, a pivoted oscillating conveyer, a conduit for conducting the studs from the feeder to the oscillating conveyer, a vertically movable and rotating chuck, and devices on the oscillating conveyer operated by the movements of the latter for inserting the stud into the chuck from said conveyer, substantially as described.

3. The combination of a pivoted oscillating stud-conveyer with a rotary chuck, and means, substantially as described, for moving the stud from the oscillating conveyer into the chuck, substantially as set forth.

4. The combination of a rising and falling and rotating chuck with an oscillating stud-conveyer, and a device mounted on and carried by said conveyer for moving the stud from the conveyer into the chuck, substantially as described.

5. The combination of a rising and falling chuck with means, substantially as described, for rotating said chuck when in its elevated position, as set forth.

6. The combination, with a rising and falling rotating chuck, of a conveyer having an oscillatory motion about its own axis, and a device contained in said conveyer and actuated by the same to insert the lacing-stud when the chuck is in its lower or receiving position, substantially as shown and described.

7. The combination, with a rotary chuck, of a socket in said chuck, opening laterally for receiving the lacing-stud, and an oscillatory conveyer having a sliding inserting-bolt actuated by the oscillation of the conveyer to push the conveyed lacing-studs into said socket, substantially as shown and described.

8. The conveyer C, consisting of a stationary portion and a movable portion, the latter carrying a conveying-lever, I, adapted to retain the lacing-stud, substantially as shown and described.

9. The conveyer C, consisting of a stationary and a movable portion, the latter carrying a conveying-lever, I, constructed to retain the lacing-stud in the conveyer, and a pin for throwing the lever aside when the conveyer receives the stud, substantially as shown and described.

10. The combination, with a chuck, as D, of a conveyer consisting of a stationary and an oscillating portion, a lever, I, carried by the oscillating portion, and an open jaw on said lever for embracing the stud, whereby said stud is retained as the conveyer moves toward the chuck, but is deposited in line with the latter when said oscillating portion reverses, substantially as shown and described.

11. The combination, with a chuck, of a pivoted-stud conveyer, C, oscillating in a plane at right angles to the chuck and provided with a sliding bolt operated by the oscillation of the conveyer to insert the stud into the chuck, substantially as described.

12. The combination, with a chuck, as D, of a conveyer, C, consisting of a stationary and a movable portion, a spring-pressed inserting-bolt, a lever, J', engaging the bolt and pivoted to said stationary portion, a catch, $J^2$, carried by the movable portion and actuated to engage and to release the lever J', substantially as shown and described.

13. The conveyer C, having the recess $g'$, in combination with the movable recessed lever H, the two recesses forming a socket to guide and receive the lacing-stud, substantially as shown and described.

14. The conveyer C, consisting of a stationary and a movable portion, and the spring-pressed guide-lever H, pivoted to the stationary portion, and a pin carried by the movable portion for closing said guide-lever H when the conveyer receives the lacing-stud, substantially as shown and described.

15. The conveyer C, consisting of a stationary and a superimposed movable portion, a guide ring or wall, $g^2$, between said portions, and a conveying-lever, I, carried by the movable portion and constructed to retain the lacing-stud loosely between itself and the said guide-ring, substantially as and for the purpose set forth.

16. The combination, with the chuck D, containing a socket opening laterally for the reception of the lacing stud, of a shank, E, and a pin or projection on said shank, adapted to extend into said socket on one side of the lacing-stud to retain the same, substantially as shown and described.

17. The combination, with the hollow chuck D, containing a socket, of a rising and falling shank protruding into the chuck, the pin-and-slot connection of the chuck and shank, and a pin adapted to extend into the said socket, substantially as shown and described.

18. The combination, with a hollow rotary chuck containing a socket and fitted movably in the direction of its length in the casing, of a spring supporting the same, a stop, as $e$, to limit the upward motion of said chuck, a rising and falling shank, E, having a pin-and-slot connection with the chuck, and a pin on said shank adapted to enter the socket in the chuck after the insertion of the lacing-stud and before the chuck rises, substantially as shown and described.

19. The combination, with the chuck D and the wedge-shaped carrier K, of an inclined actuating-slide engaging the carrier, substantially as shown and described.

20. The combination, with the chuck D and its wedge-shaped carrier K, of an inclined slide, K', engaging the carrier, and the means described for actuating the slide to reciprocate the punch in the direction of its axis, substantially as shown and described.

21. The combination, with the chuck D and a gear-wheel, D', secured to the shank thereof, of a pivoted toothed segment oscillating in the arc of a circle, and the slide K', operated by the segment to move the chuck longitudinally, substantially as described.

22. The combination, with the chuck D, of a gear-wheel attached to the shank thereof, a toothed driving-segment meshing into said gear, means for vibrating said segment, a catch, P, for locking the segment at the end of the first half of its vibration, and means, substantially as described, for releasing the segment, substantially as shown and described.

23. The chuck D, having a laterally-opening socket or jaw, d, in combination with a pin or projection adapted to incase the lacing-stud, substantially as shown and described.

24. The combination, with the conveyer-spindle g, of a driving-segment, as N, engaging said spindle to rotate the same, and a releasing device for freeing the spindle from engagement with the driver, substantially as shown and described.

25. The combination, with the conveyer and its spring-impelled spindle g, of a driver, as N, engaging said spindle to rotate the same in a direction opposed to the spring, and a releasing device for freeing the spindle from engagement with the driver, substantially as shown and described.

26. The combination, with the conveyer and its spring-impelled spindle g, having a laterally-projecting arm, c', of a driver, as N, a catch, as C', on said driver and engaging said arm c', and a lever, l L', carrying an actuating mechanism for withdrawing said catch to release the arm c', substantially as shown and described.

27. The combination, with the conveyer and its spring-impelled spindle g, having an arm, c', of a pivoted driver, as N, a catch, C', carried by said driver, a trip-lever, C², an arm, c², on the catch C', adapted to engage with one arm of the trip-lever when the spindle g has been rotated in a direction opposed to the spring, and a lever, U, carrying a cam for actuating the trip-lever, substantially as shown and described.

28. In a lacing-stud-inserting mechanism, the combination, with a chuck, D, and an actuating-slide, K', for the same, of a lever, as l L', engaging with said slide to depress the chuck, and a pivoted driver, as N, engaging with said chuck to elevate the same, substantially as shown and described.

29. In a lacing-stud-inserting mechanism, the combination, with a chuck and a conveyer, of a slide, K', for imparting a rising and falling motion to the chuck, a driver, as N, for rotating the same, and the conveyer in conjunction with a crank-lever, as l L', substantially as shown and described.

30. The combination, with the slide K' and the driving-segment N, for actuating the chuck, of the teeth q q', carried by the same and operating substantially as shown and described.

31. The combination, with the feeder A, of a rotary feed-plate, W, arranged in the bottom of the feeder and having a circular series of cells, w, to receive the studs, the opening and closing jaws Z Z', for retaining the studs in said cells, and extending into the line of the latter, and an ejector, B', for expelling the studs not held by the jaws, substantially as described.

32. The combination, with a rotary feed-plate containing sockets or cells, of retaining-jaws extending into the line of cells from opposite sides and actuated by the feed-plate, and an ejector projecting at right angles to the plane of the jaws and between the same, substantially as shown and described.

33. The combination, with a rotary feed-plate containing sockets or cells, of spring-pressed pivoted retaining-jaws extending into the line of cells from opposite sides and opened by the feed-plate, and a spring-pressed ejector extending upwardly into the cells and depressed by the rotation of said feed-plate, substantially as shown and described.

34. The combination, with a rotary feed-plate containing sockets or cells, of stationary retaining-jaws in the line of the cells for holding the studs, and a stationary ejector extending between said jaws to eject the studs not held by said jaws, the cells in the rotation of the feed-plate being brought to the jaws and ejector, substantially as shown and described.

35. The combination, with a casing, of a rotary feed-plate containing cells or sockets and located in the bottom of said casing, stationary sleeves A² A³, forming a receiving-chamber, retaining-jaws carried by said sleeves and projecting into the cells, and an ejector, substantially as shown and described.

36. The combination, with a casing and a moving feed-plate containing cells or sockets, of a discharge-orifice, as W', in the casing, and a stop, W², substantially as shown and described.

37. The combination, with the casing and with the feed-plate containing cells or sockets, of a discharge-orifice, W', in the casing, a driving-shaft, U, for the feed-plate, a ratchet-wheel secured to the shaft, a pawl engaging with the same, a vibratory pawl-frame, and stops u³ u⁴, whereby an intermittent motion is imparted to the feed-plate and the cells are successively brought into line with the discharge-orifice, substantially as shown and described.

38. The combination, with the feeder A, the rotary feed-plate W, the bottom thereof having a circular series of cells, and an ejector for expelling the studs through the cells into the discharge-opening, of a brush rotating in the path of the cells at one side of the ejector for expelling such studs as are improperly received in the cells, substantially as described.

39. The combination, with the rotary feed-plate having an annular series of cells, the retaining-jaws, and an ejector, of a brush-wheel situated at one side the latter and rotating in a plane at right angles to the plane of the feed-plate for expelling such studs as are improperly received in the cells, substantially as shown and described.

40. The combination, with a feed-plate having an intermittent rotary motion and having an annular series of cells, the retaining-jaws, and an ejector, of a brush-wheel rotating intermittently and with a variable angular velocity for expelling such studs as are improperly received into the cells, substantially as shown and described.

41. The combination, with a feed-plate having a rotary motion, of a brush-wheel, $B^2$, the driving-gears $F^*$ $F^2$ $F^3$ therefor, the pawl-frame $F^4$ $F^5$ $F^6$, and pawls engaging the gears $F^2$ $F^3$, a spring-pressed lever, $D^5$, the connection of the pawl-frame with said lever $D^5$, and the rock-shaft $D^6$, engaged by pins or equivalent devices $d^5$ on the feed-plate, whereby a variable motion in one direction is imparted to the brush-wheel, substantially as shown and described.

42. The hopper T, having a discharge-orifice, $t$, and a pronged clearing-lever, V, vibrating across the same, substantially as shown and described.

43. The hopper T, having inclined walls, a discharge-orifice, $t$, a pronged clearing-lever, V, vibrating across the same, and an adjustable gate, V', substantially as shown and described.

44. The hopper T, having inclined walls, a rotary agitator, U*, a discharge-orifice located between said inclined walls, and a clearing-lever, V, vibrating across the same, substantially as shown and described.

45. In a feeder, the combination, with a feed-plate, of an ejector for expelling such lacing-studs as are not properly received by the feed-plate, substantially as shown and described.

46. The combination, with the feeder and rotary feed-plate W, having a circular series of cells, of opening and closing jaws for seizing and holding the properly-received studs, and an ejector for ejecting the studs through the cells which are not held by said jaws, substantially as described.

47. The feeder A, in combination with the mechanism described for actuating the same, such mechanism consisting of a forked lever, as $U^3$, and a cam, as $U^4$, on the driving-shaft of the inserting mechanism, substantially as shown and described.

48. The combination, with a casing containing a receiving-chamber, a hopper having a discharge-orifice opening into the chamber, a feed-plate located at the bottom of said chamber and closing the same, a circular series of cells or sockets in the same, means for imparting an intermittent rotary motion to said feed-plate, retaining devices, and an ejector, substantially as shown and described.

49. The circular feed-plate containing a series of cells, a groove forming cam-surfaces for the depression of the ejector, and lateral grooves or cam-surfaces for separating or opening the retaining-jaws, substantially as shown and described.

50. The circular feed-plate containing a series of cells, a groove forming cam surfaces for the depression of the ejector, lateral grooves or cam-surfaces for opening the retaining-jaws, and pins for actuating the distributing-wheel mechanism, substantially as shown and described.

51. The rotary feed-plate W, in combination with the stationary hubs or sleeves $A^2$ $A^3$, and a casing for guiding said feed-plate, retaining-jaws pivoted and sustained by said sleeves or hubs, and an ejector sustained by the casing, substantially as shown and described.

In testimony whereof I have hereunto set my hand and seal in the presence of two subscribing witnesses.

HUGH A. KINGSLAND. [L. S.]

Witnesses:
CONSTANT C. HODGMAN,
ISAAC E. CHANDLER.